United States Patent
Levasseur

(10) Patent No.: US 9,821,705 B2
(45) Date of Patent: Nov. 21, 2017

(54) LIGHTING DEVICE CARRYING OUT MULTIPLE LIGHTING FUNCTIONS OF AN AUTOMOTIVE VEHICLE USING FUNCTIONALLY DEDICATED LIGHT SOURCE GROUPS

(71) Applicant: Valeo Vision, Bobigny (FR)

(72) Inventor: Stephane Levasseur, Briollay (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/140,947

(22) Filed: Apr. 28, 2016

(65) Prior Publication Data

US 2016/0318439 A1 Nov. 3, 2016

(30) Foreign Application Priority Data

Apr. 29, 2015 (FR) .................................... 15 53889

(51) Int. Cl.
*B60Q 1/14* (2006.01)
*B60Q 1/04* (2006.01)
*H05B 33/08* (2006.01)

(52) U.S. Cl.
CPC ............ *B60Q 1/1423* (2013.01); *B60Q 1/04* (2013.01); *H05B 33/0845* (2013.01)

(58) Field of Classification Search
CPC ...... B60Q 1/0267; B60Q 1/04; B60Q 1/1423; B60Q 1/34; H05B 33/0815; H05B 33/0827; H05B 33/083; H05B 33/0845; H05B 33/0887
USPC ....................... 315/77, 80, 82, 291
See application file for complete search history.

(56) References Cited

U.S. PATENT DOCUMENTS

| | | | | |
|---|---|---|---|---|
| 6,975,070 | B2 * | 12/2005 | Namba | H05B 33/0818 315/209 R |
| 7,081,708 | B2 | 7/2006 | Ito et al. | |
| 7,173,375 | B2 | 2/2007 | Takeda et al. | |
| 7,403,107 | B2 | 7/2008 | Ito et al. | |
| 9,126,530 | B2 | 9/2015 | Suganuma et al. | |
| 9,357,597 | B2 * | 5/2016 | Nakamura | F21S 48/1747 |
| 2004/0075393 | A1 * | 4/2004 | Ito | H05B 33/0845 315/77 |
| 2004/0179366 | A1 | 9/2004 | Takeda et al. | |
| 2006/0055244 | A1 | 3/2006 | Ito et al. | |
| 2012/0229027 | A1 * | 9/2012 | Huang | B60Q 1/2607 315/80 |
| 2014/0015430 | A1 * | 1/2014 | Kurt | H05B 33/083 315/193 |
| 2015/0069909 | A1 | 3/2015 | Suganuma et al. | |

FOREIGN PATENT DOCUMENTS

FR 2875670 A1 3/2006

* cited by examiner

*Primary Examiner* — Tung X Le
(74) *Attorney, Agent, or Firm* — Jacox, Meckstroth & Jenkins

(57) ABSTRACT

A lighting device for an automotive vehicle comprising means for controlling the supply of power to a plurality of light sources, the plurality of sources being divided into at least two groups of sources. The device according to the invention is remarkable in that each of the light source groups fulfills a specific lighting function of the device and is distinguished by a requirement for electric current of a specific intensity. Additionally, the control means are capable of selectively supplying power to each of the light source groups exclusively of the other groups. A power supply method implementing the device according to the invention is also proposed.

27 Claims, 3 Drawing Sheets

LIGHTING DEVICE CARRYING OUT MULTIPLE LIGHTING FUNCTIONS OF AN AUTOMOTIVE VEHICLE USING FUNCTIONALLY DEDICATED LIGHT SOURCE GROUPS

CROSS-REFERENCE TO RELATED APPLICATIONS

This application claims priority to the French application 1553889 filed Apr. 29, 2015, which applications are incorporated herein by reference and made a part hereof.

BACKGROUND OF THE INVENTION

1. Field of the Invention

The invention pertains to the field of lighting devices of an automotive vehicle, such as headlamps using a plurality of light sources, of light-emitting diode (LED) type for example, in order to carry out multiple lighting functions of the automotive vehicle.

2. Description of the Related Art

In the field of lighting devices for automotive vehicles, it is of interest to be able to create one and the same optical signature for various implemented lighting functions. For example, it is useful for the position lights (PLs) to have a similar or identical appearance to the daytime running lights (DRLs), which nevertheless have a higher luminous intensity.

It has been proposed to use the same light sources, of light-emitting diode (LED) type for example, to achieve such an objective. According to the chosen source type, the diodes may actually emit light of higher or lower intensity according to the intensity of the electric current passing therethrough. In a known manner, the supply of electrical power to LEDs is controlled by a device that comprises a converter circuit capable of converting an input voltage, typically provided by the battery of the automotive vehicle, to an output voltage of a different value that is applied to the LEDs connected to load the converter. However, such a solution is limited to the use of the same type of LED for the emission of a low level of light and a high level of light, while not all LEDs are necessarily well adapted to multiple operating modes.

SUMMARY OF THE INVENTION

An aim of the invention is to overcome at least one of the problems posed by the prior art. More specifically, an aim of the invention is to propose a lighting device for an automotive vehicle that uses a plurality of light sources divided into multiple groups, each group implementing a specific lighting function and each group being supplied with power exclusively of the other groups. Another aim of the invention is to propose a power supply method that makes use of the device according to the invention.

A subject of the invention is a lighting device for an automotive vehicle comprising means for controlling the supply of power to a plurality of light sources, the plurality of sources being divided into at least two groups of sources. The device is remarkable in that each group is intended to fulfill a specific lighting function of the device and is distinguished by a requirement for electric current of a specific intensity in order to carry out the lighting function. The device is also remarkable in that the control means are capable of selectively supplying power to each of the light source groups exclusively of the other groups.

The at least two light source groups may preferably be separate groups.

Preferably, a first light source group may have a requirement for electric current of a first intensity, and a second light source group may have a requirement for electric current of a second intensity, the second intensity being lower than the first intensity.

The lighting functions may advantageously be preset regulatory photometric functions.

Preferably, the control means may comprise, for each of the light source groups, a dedicated DC/DC converter that is capable of converting an input voltage to an output voltage. Each group of sources is connected to load one of the converters.

Alternatively, the control means may preferably comprise a DC/DC converter that is capable of converting an input voltage to an output voltage, each of the load groups of which may be switched exclusively of the other groups using switching means. The switching means are configured to selectively switch one of the light source groups to load the converter, depending on a signal received from detection means. The signal is representative of a value of the intensity of an electric current that flows in the electrical circuit connected to load the converter and/or of the value of a voltage detected across the terminals of the circuit.

Advantageously, the light source groups and the switching means may be mounted on one and the same support, implemented by a printed circuit board, for example. The DC/DC converter and/or the switching means may be positioned on a support that is separate from that of the light source groups.

Preferably, the switching means may comprise a microcontroller element.

The switching means may preferably comprise, for each light source group, a switch element, preferably a transistor. The transistor may be of field-effect transistor (FET) type, and preferably of field-effect transistor type in which a metal gate is electrically insulated from the substrate by a dielectric oxide (MOSFET).

The light source groups may preferably be positioned on circuit branches that are parallel to one another, the circuit being connected to load the converter. Preferably, the switching means are in this case configured in such a way as to allow electric current to flow into one of the branches of the assembly selectively and exclusively of the other branches.

Alternatively, the light source groups may be positioned on one and the same branch of a circuit that is connected to load the converter. In this case, the switching means are preferably configured in such a way as to allow electric current to flow through the light sources of one of the groups of sources selectively by shorting the sources of the other groups. Advantageously, the sources belonging to a group are sequentially connected in series. All of the groups may preferably be sequentially connected in series.

Preferably, the detection means may comprise a shunt resistor that is connected downstream of the light source groups and is connected to the ground. The resistor allows measurement of an indicator of the intensity of the current flowing in the circuit connected to load the converter.

The control means may preferably comprise at least one second converter that is intended to supply power to at least one additional light source group.

Advantageously, one of the light source groups may carry out the lighting function of "daytime running lights" (DRLs) and a different group may carry out the lighting function of "position light" (PL). Advantageously, an additional light source group may carry out the lighting function of "turn indicator" (TI). This additional group may be mounted on the same support as that of the other light source groups.

Preferably, the light sources may comprise light-emitting semiconductor chips, in particular light-emitting diodes (LEDs) and/or power LEDs and/or laser diodes.

The device according to the invention may preferably comprise an optical device that is intended to distribute the light emitted by each of the light source groups in order to carry out the lighting functions. The optical device may comprise at least one optical lens.

Preferably, the optical device may be a light guide that has at least one input face for receiving light rays emitted by the light source groups and one common output face for carrying out the lighting functions.

Preferably, the light sources of each of the groups may be positioned in the device in such a way as to define an optical signature that is similar or identical to that defined by the other light source groups.

Another subject of the invention is a method for supplying electrical power to one light source group out of a plurality of light source groups, each group implementing a specific lighting function of a lighting device of an automotive vehicle and each group being distinguished by a supply of electrical power of a specific required level. The method is remarkable in that it comprises the following steps:

provision of a device for controlling the supply of power to the light sources of the lighting device, comprising a DC/DC converter that is capable of being controlled in such a way as to provide a specific supply of electrical power depending on the required lighting function;

detection, using detection means, of a level of electrical power supply that is provided by the converter in an electrical circuit that is connected to load the converter;

selection and switching, using switching means, of a group of light sources to load the converter, the chosen group corresponding to the group whose required level of electrical power supply corresponds overall to the detected level of electrical power supply.

The device according to the invention has the advantage that it can carry out multiple lighting functions of an automotive vehicle while using standard converter circuits and without requiring specific redevelopment of the latter. The light sources of each of the groups are chosen so as to be able to best achieve the lighting required by the lighting function implemented by the group. According to preferred embodiments of the invention, a plurality of light source groups may in particular be supplied with power via a single converter. Switching means that are separate from the converter, and which may be implemented at low cost by using simple electronic components, effectively allow the modular design of such a device.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the aid of the exemplary description and the drawings, in which.

DETAILED DESCRIPTION OF THE PREFERRED EMBODIMENTS

Figure 1:
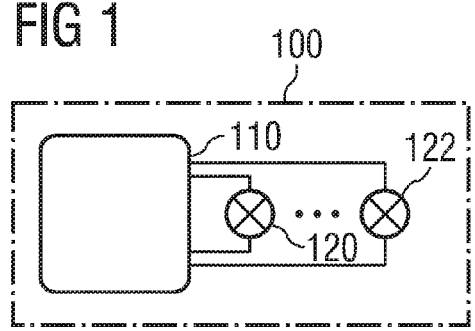
FIG. 1 is a diagrammatic representation of a preferred embodiment of the device according to the invention.

In the following description, similar reference numerals are used to describe similar concepts across the various embodiments of the invention. Thus, the numerals 100, 200, 300, 400, 500 and 600 describe a device according to the invention in five different embodiments.

Unless specified otherwise, technical features that are described in detail for one given embodiment may be combined with the technical features that are described in the context of other embodiments described by way of non-limiting example.

FIG. 1 diagrammatically shows a device 100 according to one embodiment of the invention. It is a lighting device for an automotive vehicle. The parts of the device 100 that are not directly linked to the invention are not illustrated for the sake of presentational clarity. In particular, the device 100 is supplied with electricity in a known manner by a current source that is internal to the automotive vehicle, for example by the vehicle battery. Means for controlling 110 the supply of power to a plurality of light sources form part of the device 100. In a known manner, these control means 110 may comprise at least one converter element or circuit that is capable of converting an input voltage of a given value to an output voltage of a different value. The converter may be of step-up (boost) or step-down (buck) type, or correspond to another architecture known per se by a person skilled in the art, such as the "flyback" or "SEPIC" architecture. As the operation of such converters is known per se in the prior art, it will not be described in any more detail below. In the example shown, the control means 110 comprise two outputs and may provide two separate output voltages to two circuit branches that are connected to load the control means. Of course, the control means 110 may also comprise a greater number of outputs without falling outside the scope of the present invention. Each of the load branches comprises a respective light source group 120, 122, which are illustrated by a single symbol in FIG. 1. Each of the light source groups 120, 122 preferably comprises a plurality of light sources, and the pluralities of light sources may comprise a different number of elements. Each of the light source groups 120, 122 fulfills a specific lighting function of the device 100 and is distinguished by a requirement for electric current of a specific intensity. In the case of PL and DRL functions, for example, the current intensity that is required by the light source group 120 or 122 implementing the PL function is less than that required by the light source group 120 or 122 implementing the DRL function. The means for controlling 110 the supply of power to the light sources are configured in such a way as to be able to selectively supply power to each of the light source groups 120, 122 exclusively of the other groups. For the example given above, this means that when the light sources that implement the PL function are turned on, the sources that correspond to the DRL function are turned off, and vice versa. The light sources of each light source group 120, 122 are preferably adapted to the requirements of the lighting function that they implement. They may be light-emitting diodes, for example. In the following, the terms "light source" and LED are used interchangeably, the LEDs being one exemplary light source among others that fall within the scope of the invention. The sources of each of the light source groups 120, 122 are preferably physically positioned so as to define an identical or similar optical signature. For example, the sources of the light source groups 120, 122 may be mounted on a support, such as a printed circuit board (PCB), by alternating along a contour that defines the optical signature of the lighting device 100. Alternatively, the sources of the light source groups 120, 122 may follow similar juxtaposed and mutually proximate contours.

Figure 2:
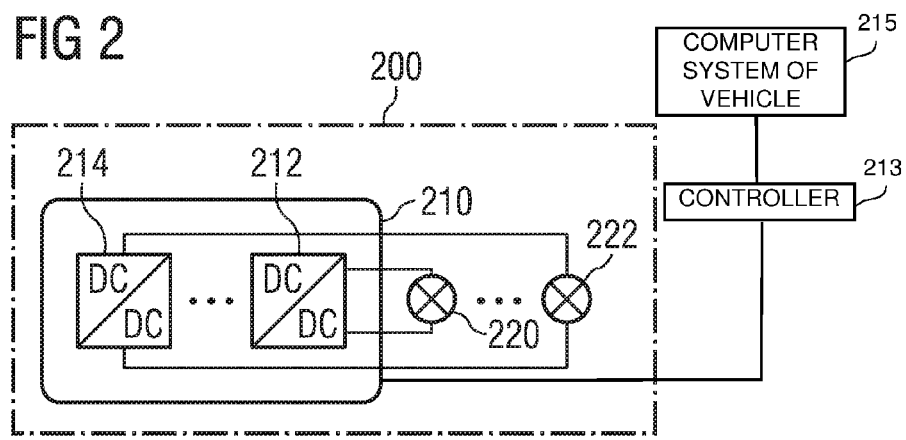
FIG. 2 is a diagrammatic representation of a preferred embodiment of the device according to the invention.

FIG. 2 shows a particular embodiment of the invention, in which the device 200 comprises one DC/DC converter element or circuit 212, 214 per light source group 220, 222 connected to load the control means 210. This architecture allows one of the light source groups 220, 222 to be selectively and exclusively supplied with power. A controller element, 213 (FIG. 2), may in particular be used for interpreting a control signal that is received by the computer system 215 (FIG. 2) of the automotive vehicle and that indicates the requirement to turn on the light source group 220, for example. Upon reception of such a signal, the controller element switches the converter element or circuit 212 to "enable" operating mode while all of the other converters switch to or remain in "disable" mode. Each of the converter elements or circuits 212, 214 is preferably configured and dimensioned in such a way as to provide a preset voltage and electric current that are adapted to the light sources to which it is intended to supply power. The dimensions that are required in such embodiments are achievable by a person skilled in the art.

Figure 3:
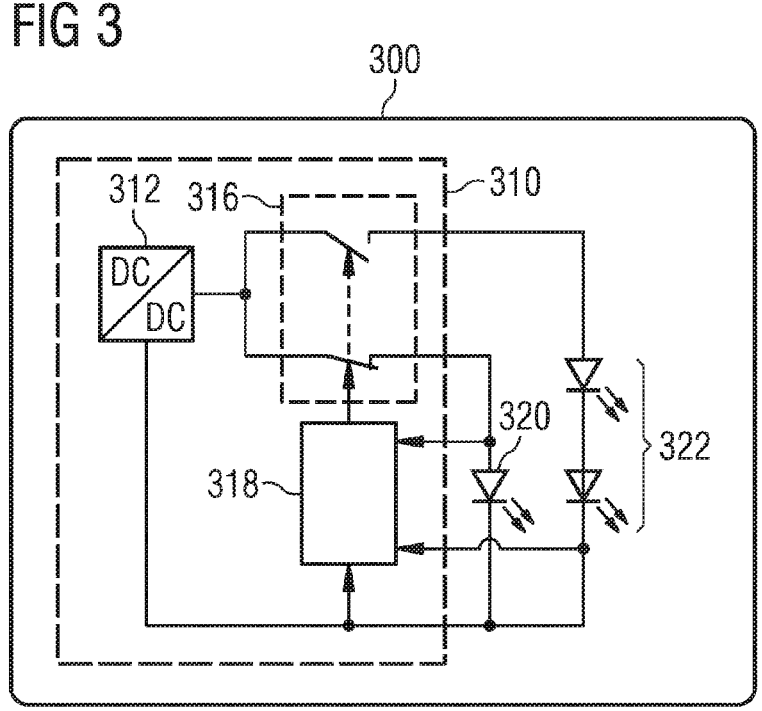
FIG. 3 is a diagrammatic representation of a preferred embodiment of the device according to the invention.

FIG. 3 shows a preferred embodiment of the device 300 according to the invention. The device 300 comprises means for controlling 310 the supply of electrical power to multiple light source groups 320, 322 that are shown as LEDs by way of example. The control means 310 comprise a single converter element or circuit 312 common to the electrical power supply of each of the light source groups 320, 322. The converter element or circuit 312 is in particular capable of supplying a specific and adapted electric current and voltage to each of the light source groups 320, 322. Switching means 316 are provided and configured in order to be able to switch one of the light source groups 320, 322, which are respectively connected on parallel circuit branches, to the output of the converter element or circuit 312. At a given instant, the single group that is switched to load the converter element or circuit 312 is supplied with electricity, while the other groups are not. The selection of the light source group 320 or 322 to be switched to load the converter element or circuit 312 is made on the basis of a signal that is relayed to the switching means 316 by detection means 318. These detection means 318, illustrated in a generic manner in FIG. 3, are capable of measuring either an indicator of the intensity of the electric current flowing in the electrical circuit branch that is connected to load the converter element or circuit 312, or an indicator of the voltage across the terminals of this converter element or circuit 312. As each lighting function, and hence each of the light source groups 320, 322, requires a specific voltage and electric current, the detection means 318 may thereby indirectly detect the operating mode of the converter element or circuit 312 at any time.

While the device 300 is operating, the control means 310 receive, via a computer system of the automotive vehicle for example, a signal whose purpose is to turn on the light source group 320. The converter element or circuit 312 is then controlled so as to provide an electrical power supply that corresponds to the preset requirements of the light source group 320. Whichever light source group 320 or 322 is switched to load the switch, the detection means 318 detects the electrical power supply level provided by the converter element or circuit 312 and relay it to the switching means 316. The switching means 316 are configured, using a microcontroller element (not illustrated) for example, to be able to retranslate the electrical power supply level thus detected to the preset light source group 320 or 322 that corresponds to this power supply level. In the example given, it is the light source group 320, which is then switched to load the converter element or circuit 312. In practice, the light source group 320 or 322 corresponding to the DRL function is connected as a load by default.

Preferably, the control means 310 comprise a first table that relates a lighting function to an electrical power supply level to be provided by the converter element or circuit 312. The control of the converter element or circuit 312 is reflected by the table entry that is determined by the desired lighting function. For their part, the switching means 316 use a second table that relates a detected electrical power supply level to a specific light source group 320 or 322. The light source group 320 or 322 to be switched to load the converter element or circuit 312 is found by identifying the table entry that corresponds to the detected power supply level. By way of example, in the first table, a given lighting function A corresponds to a given power supply level B. When the function A is desired, the converter element or circuit 312 is controlled in such a way as to provide the power supply B. In the second table, a detected level B', corresponding, measurement errors aside, to this power supply level B, corresponds to the light source group C that implements the lighting function A.

In this way, one and the same converter element or circuit 312 may be used to supply power to the plurality of light source groups 320, 322 that have different electrical power supply requirements, without requiring the addition of complexity to the converter element or circuit 312. Modularity is ensured by the switching means 316 that are responsible for connecting the light source group 320 or 322 that is appropriate for the detected power supply level, and hence the operating mode of the converter element or circuit 312.

Figure 4:
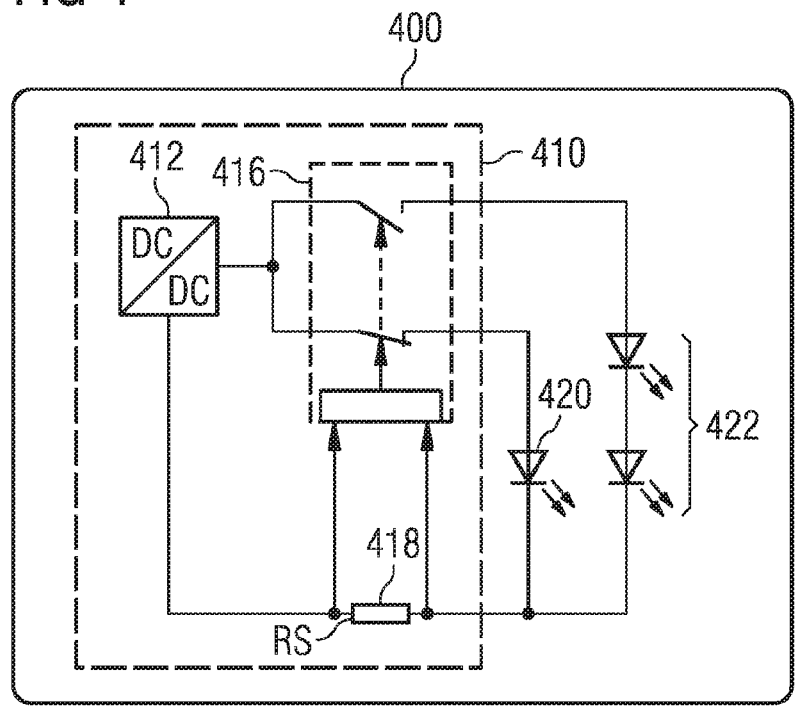
FIG. 4 is a diagrammatic representation of a preferred embodiment of the device according to the invention.

FIG. 4 goes back to the example of FIG. 3, but replaces, by way of example, the described detection means with a shunt resistor Rs that is denoted by the reference 418. The shunt resistor 418 is connected on one side to a node that is downstream of all of the light source groups 420, 422, and on the other side to the ground. In a known manner, the voltage measured across the terminals of the shunt resistor 418 may be used to deduce the intensity of the electric current that is flowing in the branch connected to load the converter 412.

Figure 5:
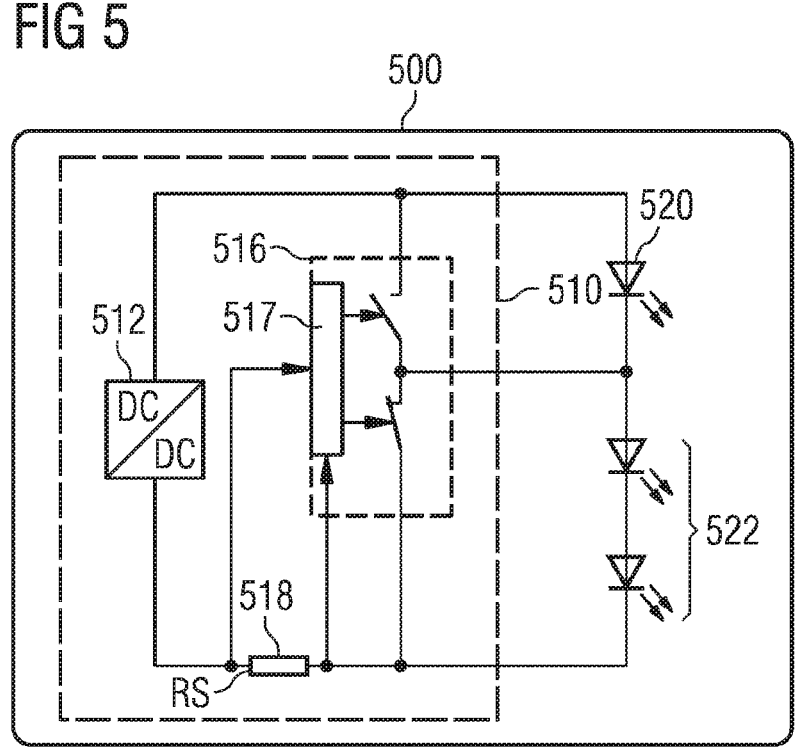
FIG. 5 is a diagrammatic representation of a preferred embodiment of the device according to the invention.

FIG. 5 shows an embodiment 500 that is similar to those of FIGS. 3 and 4, differing in that the light source groups 520, 522 are connected in series on one and the same circuit branch. Although the light sources are illustrated as being connected in series in groups, sources that belong to different groups may also alternate. In any case, the switching means 516 are configured in such a way as to short all of the light source groups 520, 522 except that identified using a selection device 517. Selection is carried out on the basis of the power supply level detected by the detection means 518 according to the detection principle described above. The selection device 518 may, for example, comprise a microcontroller element.

Figure 6:
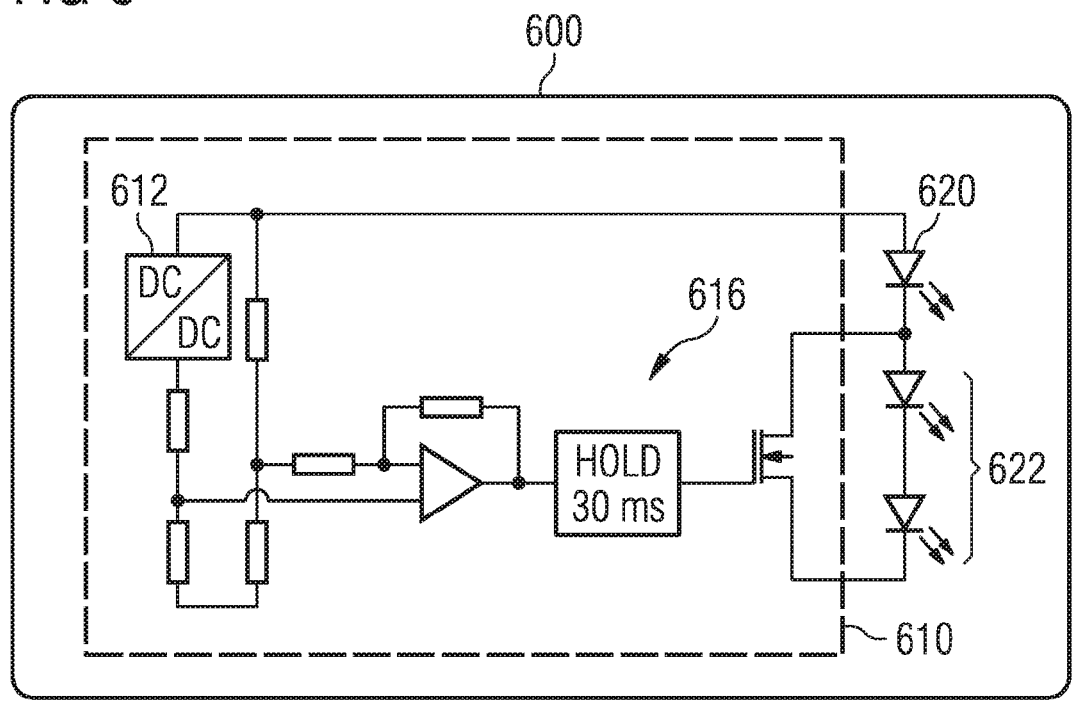
FIG. 6 is a diagrammatic representation of a preferred embodiment of the device according to the invention.

FIG. 6 diagrammatically shows an exemplary electronic circuit 600 that implements the embodiment just described. The light source groups 620, 622 are connected in series on one and the same circuit branch. The means for controlling 610 the supply of power comprise in particular a voltage regulator element 612 and switching means 616. The electronic components used are known per se in the art.

In all of the embodiments of the invention, the switching means 316, 516, 616 described may be implemented by one or more microcontroller elements and/or by a switching circuit that involves one or more switch element(s) such as transistors, in particular field-effect or MOSFET type transistors. The switching means 316, 516, 616 may be mounted on a printed circuit board that is shared with the light sources.

In all of the embodiments of the invention, the lighting device 100, 200, 300, 400, 500, 600 advantageously comprises an optical device that is common to all of the light source groups 120, 122; 220, 222; 320, 322; 420, 422; 520, 522 and that is capable of distributing or focusing the light emitted by any of the light source groups 120, 122; 220, 222; 320, 322; 420, 422; 520, 522. It is, for example, a light guide that is capable of receiving light rays through an input face, within which the light rays are guided toward an output face through which they exit the guide.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for an automotive vehicle comprising control means for controlling a supply of power to a plurality of light sources, said plurality of light sources being divided into at least two groups of light sources wherein each of said at least two groups of light sources is intended to fulfill a specific lighting function of the lighting device and is distinguished by a requirement for an electric current of a specific intensity in order to carry out said lighting function;
wherein said control means are capable of selectively supplying power to each of said at least two groups of light sources exclusively of the other or others of said at least two groups of light sources, said control means comprising:
a controller, which receives, via a computer system of the automotive vehicle, a signal and which at any given time, selectively transmits current to one of said at least two groups of light sources but not to the other or others of said at least two groups of light sources.

2. The lighting device according to claim 1, wherein said control means comprise, for each of said at least two groups of light sources, a dedicated DC/DC converter that is capable of converting an input voltage to an output voltage, each of said at least two groups of light sources being connected to load said DC/DC converter.

3. The lighting device according to claim 1, wherein said control means further comprises:
said DC/DC converter capable of converting an input voltage to an output voltage, each of said at least two groups of light sources of which is switched exclusively of the other of said at least two groups of light sources using switching means; and
said switching means being configured to selectively switch one of said at least two groups of light sources to load said DC/DC converter, depending on a signal received from detection means, said signal being representative of a value of an intensity of an electric current that flows in an electrical circuit connected to load said DC/DC converter and/or of a value of a voltage detected across terminals of said electrical circuit.

4. The lighting device according to claim 3, wherein said switching means comprise a microcontroller element.

5. The lighting device according to claim 4, wherein said switching means comprise, for each of said at least two groups of light sources, a switch element, preferably a transistor.

6. The lighting device according to claim 3, wherein said switching means comprise, for each of said at least two groups of light sources, a switch element, preferably a transistor.

7. The lighting device according to claim 3, wherein said at least two groups of light sources are positioned on parallel circuit branches, a circuit being connected to load said DC/DC converter, and in that said switching means are configured in such a way as to allow electric current to flow into one of said parallel circuit branches of an assembly selectively and exclusively of the other parallel circuit branches.

8. The lighting device according to claim 3, wherein said at least two groups of light sources are positioned on one and the same branch of a circuit that is connected to load said DC/DC converter, and in that said switching means are configured in such a way as to allow electric current to flow through said plurality of light sources of one of said at least two groups of light sources selectively by shorting said plurality of light sources of the other of said at least two groups of light sources.

9. The lighting device according to claim 3, wherein said detector comprises a shunt resistor that is connected downstream of said at least two groups of light sources and is connected to the ground, allowing measurement of an indicator of an intensity of a current flowing in a circuit connected to load said DC/DC converter.

10. The lighting device according to claim 3, wherein said controller comprises at least one second converter, intended to supply power to at least one additional light source group.

11. The lighting device according to claim 1, wherein one of said at least two groups of light sources carries out a lighting function of daytime running lights (DRLs) and one of said at least two groups of light sources carries out a lighting function of position light (PL).

12. The lighting device according to claim 11, in which said one of said at least two groups of light sources defines a default load and comprises a group of light sources which carries out the lighting function of daytime running lights (DRLs).

13. The lighting device according to claim 1, wherein said plurality of light sources comprise light-emitting semiconductor chips, in particular light-emitting diodes (LEDs).

14. The lighting device according to claim 1, wherein said lighting device comprises an optical device that is intended to distribute the light emitted by each of said at least two groups of light sources in order to carry out said lighting functions.

15. The lighting device according to claim 1, wherein said plurality of light sources of each of said at least two groups of light sources are positioned in said lighting device in such a way as to define an optical signature that is similar or identical to that defined by the other said at least two groups of light sources.

16. The lighting device according to claim 1, in which said at least two groups of light sources emit light of similar optical intensity.

17. The lighting device according to claim 16, in which said at least two groups of light sources emit light of similar color.

18. A method for supplying electrical power to one light source group out of a plurality of light source groups, each of said plurality of light source groups implementing a specific lighting function of a lighting device of an automotive vehicle and each of said plurality of light source groups being distinguished by a supply of electrical power of a specific required level, comprising the following steps:
provision of a device for controlling a supply of power to light sources of said lighting device, comprising a DC/DC converter that is capable of being controlled in such a way as to provide a specific supply of electrical power depending on the required lighting function;
detection, using detection means, of a level of electrical power supply that is provided by said DC/DC converter in an electrical circuit that is connected to load said DC/DC converter; and
selection and switching, using switching means, of a group of light sources to load said DC/DC converter, a chosen group of said plurality of light source groups corresponding to a group whose required level of electrical power supply corresponds overall to a detected level of electrical power supply, wherein:
one group of the plurality of light source groups is connected as a load by default, and
a computer system which configures said device to deliver required current, at a preset DC voltage, to the default group, and to no other groups.

19. The lighting device according to claim 18, in which said at least two groups of light sources emit light of similar optical intensity.

20. The lighting device according to claim 19, in which said at least two groups of light sources emit light of similar color.

21. A lighting device for an automotive vehicle comprising a controller for controlling a supply of power to a plurality of light sources, said plurality of light sources being divided into at least two groups of light sources, wherein each of said at least two groups of light sources is intended to fulfill a specific lighting function of the lighting device and is distinguished by a requirement for an electric current of a specific intensity in order to carry out said lighting function;
and said controller is capable of selectively supplying power at a preset DC voltage to each of said at least two groups of light sources exclusively of the other of said at least two groups of light sources;
wherein said controller receives, via a computer system of the automotive vehicle, a signal and which at any given time, selectively transmits current to one of said at least two groups of light sources but not to the other or others of said at least two groups of light sources.

22. The lighting device according to claim 21, wherein said controller comprises, for each of said at least two groups of light sources, a dedicated DC/DC converter that is capable of converting an input voltage to an output voltage, each of said at least two groups of light sources being connected to load one of said DC/DC converters.

23. The lighting device according to claim 21, wherein said controller comprises:
a DC/DC converter capable of converting an input voltage to an output voltage, each of said at least two groups of light sources of which is switched exclusively of the other of said at least two groups of light sources using a switch; and
said switch being configured to selectively switch one of said at least two groups of light sources to load said DC/DC converter, depending on a signal received from a detector, said signal being representative of a value of an intensity of an electric current that flows in an electrical circuit connected to load said DC/DC converter and/or of a value of a voltage detected across terminals of said electrical circuit.

24. The lighting device according to claim 23, wherein said switch comprises a microcontroller element.

25. The lighting device according to claim 23, wherein said switch comprises, for each of said at least two groups of light sources, a switch element, preferably a transistor.

26. The lighting device according to claim 21, in which said at least two groups of light sources emit light of similar optical intensity.

27. The lighting device according to claim 21, in which
one of said at least two groups of light sources is connected as a load by default,
a detector identifies said at least two groups of light sources connected by default and sends a signal so indicating to the controller, and
said computer system configures the controller to deliver required current to the default group of light sources, and to no other groups.

* * * * *